United States Patent [19]

Skapura

[11] 4,272,907  
[45] Jun. 16, 1981

[54] ANIMAL TRAP

[76] Inventor: Victor Skapura, P.O. Box 77, Lore City, Ohio 43755

[21] Appl. No.: 70,838

[22] Filed: Aug. 29, 1979

[51] Int. Cl.³ .............................................. A01M 23/26
[52] U.S. Cl. ............................................ 43/92; 43/96
[58] Field of Search ................. 43/92, 93, 88, 94, 95, 43/96

[56] References Cited

U.S. PATENT DOCUMENTS

| 312,094 | 2/1885 | Cook et al. | 43/95 |
| 904,024 | 11/1908 | Sprague | 43/92 |
| 919,116 | 4/1909 | Barber | 43/92 |
| 1,122,151 | 12/1914 | Petty | 43/92 |

Primary Examiner—Nicholas P. Godici  
Attorney, Agent, or Firm—Jay H. Maioli

[57] ABSTRACT

An improved animal trap of the leg-hold type has a trap pan formed with a grid having all lower surfaces tapered to a knife edge so that there is no requirement to cover the trap pan with paper or plastic when covering the entire trap with fine dirt to disguise the trap from the animal. The dirt placed over the trap is permitted to fall beneath the inventive grid pan, since the sharpened lower surfaces can easily penetrate this dirt. Stabilizing legs are attached to the trap frame to permit the trap to be firmly anchored in the ground when it is set.

10 Claims, 8 Drawing Figures

ANIMAL TRAP

BACKGROUND OF THE INVENTION

The present invention relates to an improvement in animal traps and particularly to an improvement in animal traps for catching land animals, typically called leg-hold traps.

Trapping has been an essential industry in the United States since the beginning of the colonization of America. The spring-loaded leg-hold trap has been a mainstay of the trapping industry for the past one-hundred years. The typical leg-hold trap has two jaws which are forceably spread apart, thereby loading a spring. The jaws are then retained in the open position by a trigger mechanism which includes a trap-pan release mechanism. Upon depressing the trap pan, the trigger is released and the two jaws are driven together in an upward motion by the energy of the loaded spring. One of the most well-known types of trap is the Victor trap, made by the Animal Trap Company, Lititz, Pa. This type of trap is excellent for trapping fur bearing animals, such as fox.

There are various techniques followed in setting the trap, in order to disguise it so that the animal will unwittingly step on the trap pan and trip the spring-loaded jaws. In setting a trap, it is essential that no human odors or traces remain. Accordingly, the trap must be not only set in a clean manner, and be totally disguised from the animal, but there must also be some lure or scent placed on or near the trap to attract the animal.

There are various types of sets for a trap and typically all of these land sets require the trap to be placed slightly below the ground level and then dirt or the like sifted over top of the trap, to hide it from the vision of the animal. Of course, in sifting dirt on top of the trap, it is necessary to prevent the dirt from lodging beneath the flat metal pan, which must be depressed in order to actuate the trap. It is currently the technique of most trappers to place a piece of wax paper, plastic, or the like over the flat metal trap pan or pedal. This wax paper will prevent the dirt used to cover the trap, from lodging underneath the pan and preventing the trap from throwing or actuating. Various problems are involved in using this technique to prevent the dirt from getting beneath the pan, one of which is that it is possible for the trapper to accidentally set off the trap while he is placing the wax paper or plastic over the trap pan. Additionally, since the paper or plastic placed on the pan creates a different type of base surface for the dirt which is to be sifted over the trap, quite frequently the dirt on the paper will dry at a different rate than the dirt on the rest of the trap, and the pan and its covering will become a different shade than the surrounding earth, thereby providing a visual indication to the animal that there is something beneath the dirt surface. Also, when wax paper or plastic is used as a trap pan cover, it will permit the odor from the freshly dug dirt where the trap is set to come out around the edge of the cover and the animal quite frequently will then dig around the edge of the cover and set off the trap in such a manner that it will not be captured.

Another disadvantage in the use of the well-known flat trap pan is that, since the trap is covered with fine dirt, the space beneath the pan must be kept free of dirt, when the pan is tramped on by the animal, the animal will feel a dead-fall type of action and the animal may immediately pull back prior to the snapping shut of the jaws. In other words, the animal will detect the sensation that there is nothing beneath the trap, i.e., no dirt resistance and the normal resistance of the ground to walking will be quite different when walking into the trap and the animal may react quickly enough to prevent its leg from being caught by the trap. An empty trap is a disappointment to a trapper.

SUMMARY OF THE INVENTION

The present invention teaches the replacement of the conventional flat metal pan with a grid pan which need not have any wax paper or plastic cover placed thereon, but which can have the dirt used to disguise the trap sifted directly onto the grid. The inventive grid pan is provided with lower edges which are tapered, preferably tapered to a knife edge, thereby permitting the inventive grid pan to cut down into the dirt covering the trap. The inventive grid trap pan does not require a void or space beneath the pan, as does the conventional flat trap pan. Additionally, the present invention teaches that the shank of the trap pan should also be tapered along its bottom edge, so that the trap-pan shank can also cut easily into the dirt used to cover the trap. The inventive grid pan operates excellently with any spring-actuated leg-hold trap and, in a preferred embodiment, is intended for use with a double-coil spring trap.

The inventive grid pan need not be formed totally as a grid but may have as few as one element or as many as five or six elements which bear the weight of the animal to trip the trigger mechanism.

Additionally, because quite frequently a trap may be dislodged by the animal approaching the trap, prior to actually setting it off, it is a feature of the present invention to provide a trap with stabilizing legs which may be placed into or driven into the ground when setting the trap. These legs will prevent the trap from being moved by the animal approaching it, thereby increasing its effectiveness.

Therefore, it is an object of the present invention to provide an improved leg-hold trap, wherein the trap pan is formed as a grid.

It is another object of the present invention to provide an improved leg-hold trap, wherein an inventive grid trap pan is provided which has lower edges tapered to a knife edge.

It is another object of the present invention to provide an improved leg-hold trap, wherein a grid pan is provided which does not require any protective covering to shield it from the dirt normally used to hide the trap.

It is still another object of the present invention to provide an improved leg-hold trap having stabilizing legs for preventing unwanted movement of the trap once it has been set.

It is still a further object of the present invention to provide an improved leg-hold trap, wherein the pan of the trap is formed of thin elongated elements, each having a knife edge at the lower edge thereof.

The manner in which these and other objects are accomplished by the present invention will be made clear from the following detailed description of the preferred embodiment.

DETAILED DESCRIPTION OF THE PREFERRED EMBODIMENT

Figure 1:
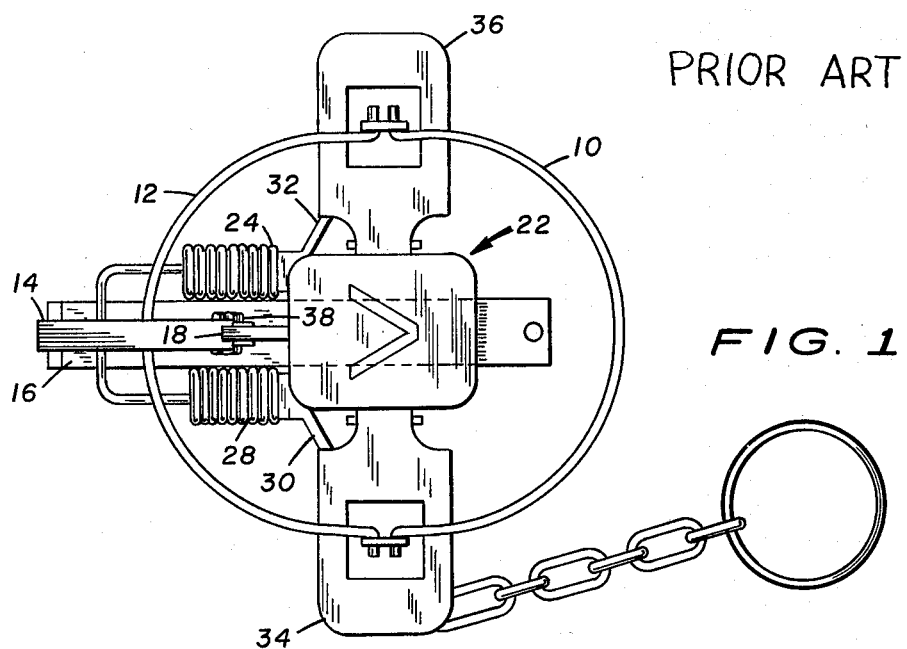
FIG. 1 is a top plan view of a prior art trap having a conventional flat metal trap pan assembly.

FIG. 1 shows a conventional leg-hold animal trap in the set or loaded position. When the trap is being set, the jaws 10 and 12, are permitted to fall downwardly from their uppermost position and the jaw 12 is retained in its open position by means of a trigger mechanism lever 14, which is pivotally attached at its rear end to a main frame bar 16 of the trap. The front leading edge of the trigger mechanism lever 14 is engaged in a notch 18 in the shank 20 of the flat trap pan 22. Jaw 10 will remain in its down or open position by the force of gravity, since the spring force is being held by the trigger mechanism lever 14. The flat trap pan 22 is the tripping mechanism which is intended to be actuated by the animal. Two coil springs 24 and 28 are affixed at the ends thereof to the frame member 16 and have the other ends or spring arms 30 and 32 mating with two actuating levers 34 and 36. The actuating levers are pivotably mounted to a frame member located beneath the flat trap pan 22. The flat trap pan 22 is pivotally attached to the frame by means of a bolt and nut assembly 38.

In the operation of this type of prior-art trap, the two jaws are forced apart, as shown in FIG. 1, thereby forcing the lever arms 34 and 36, downwardly against the action of the springs 24 and 28, the trigger mechanism lever 14 is placed over jaw 12, and its forward end is retained in the notch 18 in the flat pan trap 22. The trap is now ready to be sprung and is first located, as indicated above, in the appropriate location, a piece of wax paper or plastic is placed over the pan 22, and the entire trap is covered with finely sifted dirt.

When an animal treads upon the dirt sifted onto the paper in the area corresponding to the flat pan 22, the pan, which is pivotally mounted by nut and bolt 38, will drop downwardly and the notch 18 will come out of engagement with the end of the lever arm 14, thereby permitting the jaws 10 and 12, to be driven upwardly through the action of the lever arms 34 and 36, being driven by the springs 24 and 28, closing the trap and capturing the animal.

Figure 2:
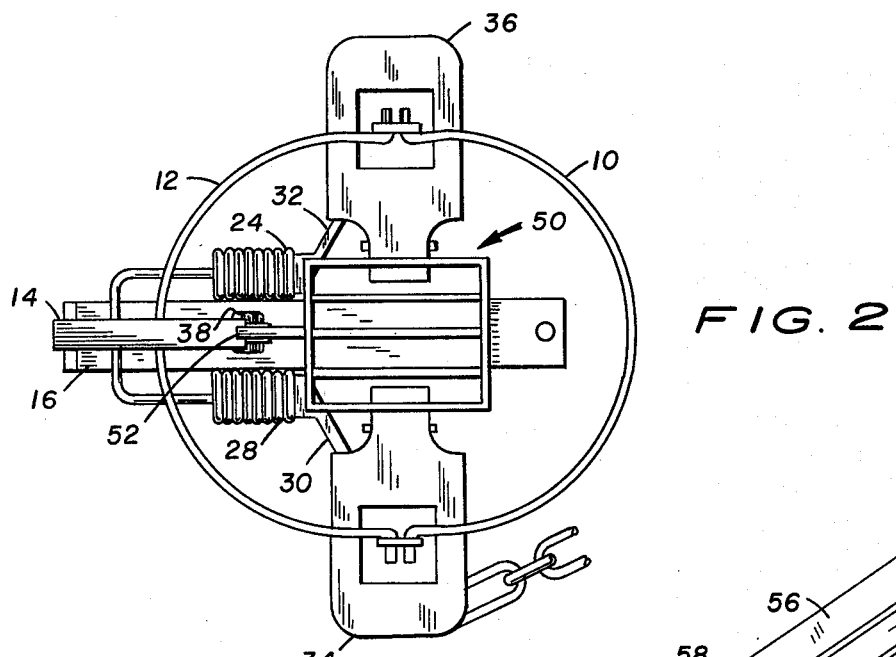
FIG. 2 is a top plan view of the trap assembly having the inventive grid pan installed thereon.

Referring now to FIG. 2, a conventional trap, as discussed in relation to FIG. 1, is shown having the inventive grid trap pan installed thereon. The inventive grid trap pan is shown at 50 and will be shown in more detail in the following drawings. The grid pan 50 is pivotally mounted to the trap frame by bolt assembly 38 and is provided with a rear notch 52 which engages the front end of the trigger mechanism lever 14 and serves to retain the jaw 12 in its downward or open position, thereby keeping lever arms 34 and 36 in the down position. In this position, the trap is set.

When this trap having the inventive grid pan installed thereon is set, there is no requirement to cover the inventive grid pan 50 with plastic or wax paper or the like to prevent dirt from falling underneath and lodging beneath the pan. The inventive grid pan 50 is formed having all lower surfaces tapered to a knife edge permitting these lower surfaces to cut into the earth, which has been sifted into and below the grid pan. In this manner, not only is the requirement for wax paper or plastic covers eliminated, but also problems involved with gophers and the like tunneling into the void beneath the grid pan, with variations in earth dryness, or earth aromas changing in relation to a plastic covered pan are eliminated.

Figure 3:
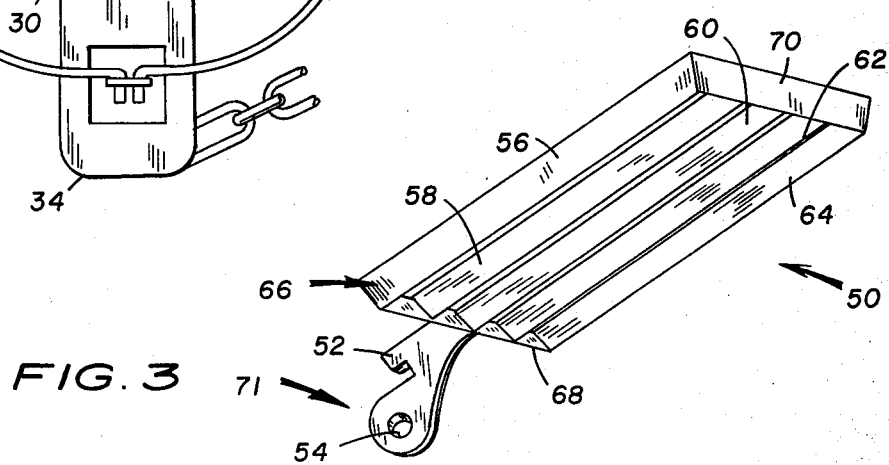
FIG. 3 is a perspective of the inventive grid pan of FIG. 2.

The particular embodiment of the inventive grid pan 50 is shown in more detail in FIG. 3, which is a perspective from the bottom rear corner. As shown in FIG. 3, the grid pan 50 has a notch 52 for receiving the leading edge of the trigger mechanism lever 14 and is provided with a clearance hole 54 for receiving the pivoting bolt mechanism 38. The inventive grid pan 50 is intended to be made of any rigid and structurally sound material, such as steel or iron but could also be formed of a rigid plastic or fiberglass. This embodiment of the grid pan is formed as a rectangle having five separate slats or bars 56, 58, 60, 62, 64. Each bar or slat is tapered at its lower edge to a knife edge. For example, bar 56 has its entire lower leading surface ground to a sharp knife edge, shown typically at 66. Similarly, the ends of the rectangle 68 and 70 are also provided with a lower surface, which has been ground into a knife edge. The downwardly facing surfaces of the shank of the inventive grid pan have also been provided with tapered leading edges, which are preferably ground to a knife edge, as shown typically at 71.

The inventive grid pan 50 is mounted on the trap, and the trap is set as shown in FIG. 2, when the trap is entirely covered with five dirt and downward pressure applied on the grid pan the knife edges, typically 71 and 66, will easily penetrate the fine dirt underneath the grid pan and will not hinder the pivoting action of the grid pan, thereby permitting the trap to be actuated.

Figure 4:
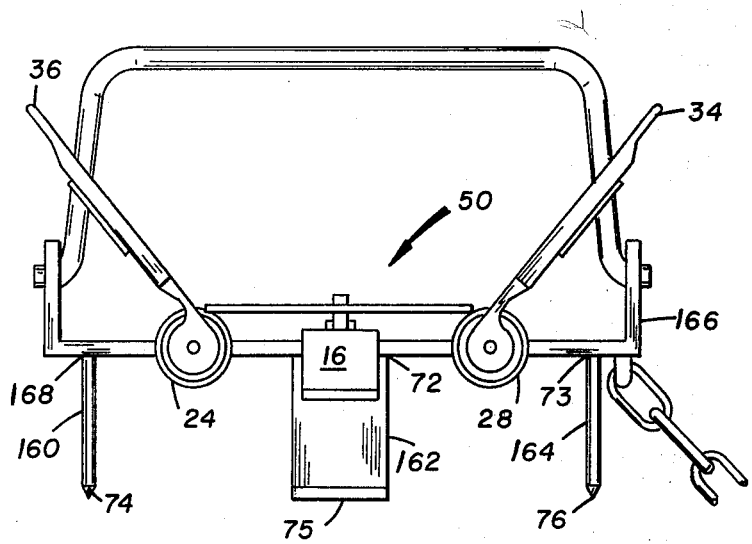
FIG. 4 is a side elevation view of a trap assembly having the inventive grid pan and stabilizing legs installed thereon.

Referring to FIG. 4, the improved trap is shown having stabilizing legs 160, 162 and 164. These stabilizing legs are welded or otherwise securely fastened to the frame 166 of the trap, at locations shown generally at 168, 71 and 72. The lowermost edges of the stabilizing legs 160, 162 and 164, are provided with chisel-like points or tapers 74, 75 and 76, respectively. When the trap is then placed at the trapping location, in place of the conventional practice of merely setting the trap on the ground surface, the stabilizing legs are forced down into the ground, thereby securely locating the trap at the desired location and preventing the trap from being moved due to movements of animals nearby. In all other respects, this trap is identical to the trap of FIG. 2

Figure 5:
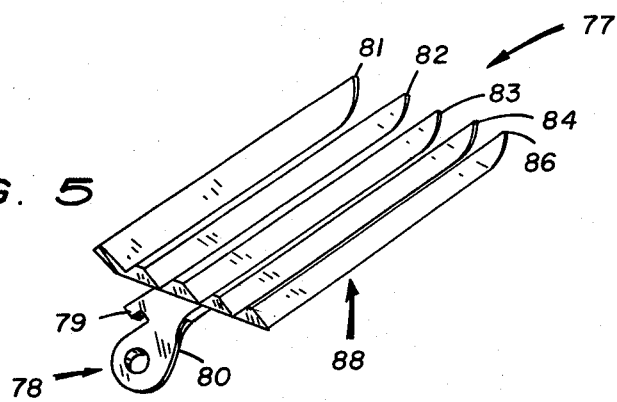
FIG. 5 is a perspective of an alternate embodiment of the inventive grid pan.

Referring now to FIG. 5, an alternate embodiment of an inventive grid pan, corresponding to grid pan 50 of FIG. 2, is shown. In this embodiment, the inventive grid pan 77 is formed having a shank 78 with a notch 79. The shank 78 is provided with a knife edge along surface 80. The grid pan 77 is formed in a fork-like arrangement having five tines or fingers 81, 82, 83, 84 and 86. The perspective of the embodiment in FIG. 5 is from the lower rear of the trap looking upwardly. Accordingly, the lower surfaces of the tines 81, 82, 83, 84 and 86 are each seen having been formed with a tapered knife edge, shown typically in relation to tine 86 at 88. This grid pan is then installed on the trap as shown in FIG.

2 and there is no requirement for covering the grid pan 77 with a paper or plastic shield.

Figure 6:
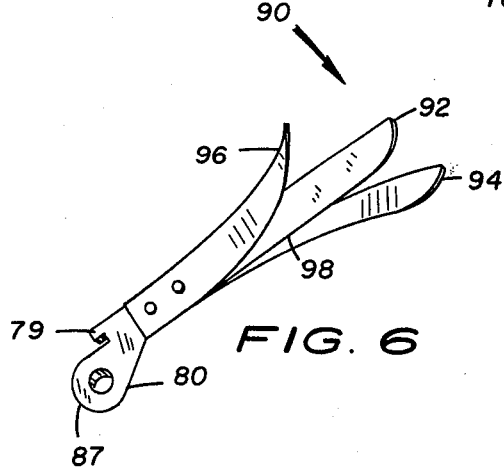
FIG. 6 is a perspective of an alternate embodiment of the inventive grid pan.

Similarly, FIG. 6 shows another embodiment of the inventive grid pan 90 in which the shank 87 is again provided with a knife edge along its entire lower leading surface. In this embodiment, the grid pan 90 is arranged as a three element prong-like device, having a straight central element 92 and two arcuately shaped side elements 94 and 96. Once again, all lower surfaces of this inventive grid pan 90 are provided with tapered leading edges, preferably ground to a knife edge. The knife edge on central tine 82 is shown typically at 98.

Figure 7:
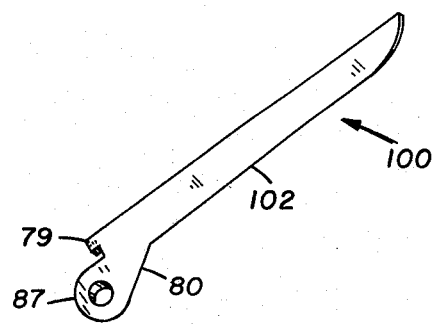
FIG. 7 is a perspective of an alternate embodiment of the inventive grid pan.

FIG. 7 is an adaptation of the grid pan of FIG. 6, in which the two arcuately shaped side elements are removed and only a single knife blade element 100 is provided to actuate the trap mechanism. The notch 79 in the rear of the shank 87 is formed as in the other embodiments and the entire leading surface 80 of the inventive grid pan 100, which can come in contact with the dirt used to cover the trap, is tapered to a knife edge, shown typically at 102.

Figure 8:
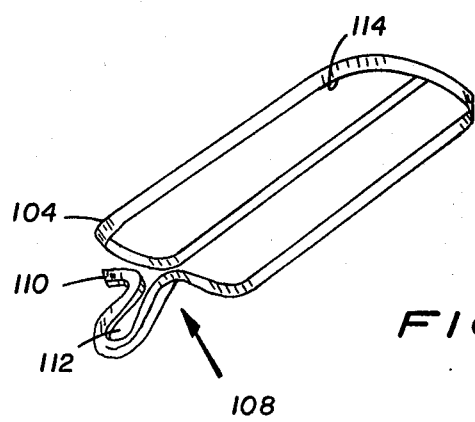
FIG. 8 is a perspective of an alternate embodiment of the inventive grid pan.

FIG. 8 shows another embodiment of the inventive grid pan, which is formed of a continuous piece of cylindrical metal, such as a steel wire 104. The embodiment 106 is formed generally as a rectangle and the trigger shank 108 is a continuation of the steel wire 104 and is formed with a recess 110 which would engage the leading edge of the trigger mechanism lever 14 of FIG. 2. The steel wire 104 forming this embodiment is looped to provide a clearance hole 112 for the pivot screw mechanism. Once again, all lower edges of steel wire 104 forming the grid pan 106 in this embodiment are tapered into a knife edge, shown typically at 114.

It is understood, of course, that the foregoing description is presented by way of example only and is not intended to limit the scope of the present invention, except as set forth in the appended claims.

What I claim is:

1. An improved spring-actuated leg-hold animal trap of the type having a trap pan pivotally mounted on the trap frame with a shank for engaging a trigger lever, which holds the trap in a set position, the trap pan defining a substantially horizontal plane, whereby upon movement of the trap pan the trigger lever is released and the trap is closed, the improvement wherein the trap pan is formed of at least one thin flat elongate element affixed to the shank, wherein all downwardly facing surfaces, in relation to the defined horizontal plane, of said at least one thin flat elongate element are tapered, substantially forming a knife edge.

2. The improved trap of claim 1, wherein the shank of the trap pan is formed having all downwardly facing surfaces, in relation to the defined horizontal plane, tapered substantially to form a knife edge.

3. The improved trap of claim 1, further comprising at least two vertically depending legs affixed to the frame of the trap and extending downwardly from the trap for embedding into the ground when the trap is placed in the desired location thereon.

4. An improved trap pan for use on a spring-actuated leg-hold trap of the type for use in a substantially horizontal position and having a lever mechanism to hold the trap in a set position, the improved trap pan comprising;
   a shank portion pivotally mounted to the frame of the trap having a notch formed in one end of the shank for cooperating with the lever mechanism to hold the trap in the set position, and
   at least one thin elongate blade element attached to the other end of said shank portion and extending into the center area of the trap, said blade element being formed having all downwardly facing surfaces, in relation to the horizontal, tapered to substantially a knife edge.

5. The improved trap pan of claim 4, wherein said shank is formed having all downwardly facing surfaces, in relation to the horizontal, tapered to form substantially a knife edge.

6. The improved trap pan of claim 4, wherein said at least one blade comprises three elements attached at one end to the other end of the shank wherein one of the three elements is arranged in the center and the elements on either side of the center element are arcuately shaped in a direction facing away from the center element, each of said three blade elements having all downwardly facing surfaces, in relation to the horizontal, tapered to a knife edge.

7. An improved animal trap of the spring-powered leg-hold type having a trigger mechanism for releasably retaining the opened jaws of the trap against the power of the spring, the improvement comprising:
   a trap pan extending into the area defined by the open jaws and being formed of a plurality of thin elongate blade elements attached to a shank portion which is pivotally mounted on the frame of the trap and includes means for cooperating with the trigger mechanism for releasing the jaws upon pivoting action of the trap pan, said plurality of thin elongate blade elements being arranged in an open gridwork and having all downwardly facing surfaces tapered to substantially a knife edge.

8. The improved animal trap of claim 7, wherein the shank is formed having all downwardly facing surfaces tapered to substantially a knife edge.

9. The improved animal trap of claim 7, further comprising at least two vertically depending legs affixed to the frame of the trap and extending downwardly from the trap for embedding into the earth when the trap is set in the desired location.

10. The improved trap of claim 7, wherein said plurality of elongate blades are arranged as a rectangle having additional blades arranged interior to the rectangle and parallel to the longer sides of the rectangle, wherein the lower surfaces of all elongate blade elements are tapered substantially to form a knife edge.

* * * * *